T. SUCHLA.

LOADING AND UNLOADING DEVICE.

APPLICATION FILED OCT. 5, 1912.

Reissued Nov. 19, 1912. 13,490.

Witnesses

J. L. Wright

Edmonston Jr.

Inventor

Thomas Suchla,

By Victor J. Evans,

Attorney

UNITED STATES PATENT OFFICE.

THOMAS SUCHLA, OF COURTENAY, NORTH DAKOTA.

LOADING AND UNLOADING DEVICE.

13,490. Specification of Reissued Letters Patent. Reissued Nov. 19, 1912.

Original No. 1,028,841, dated June 4, 1912, Serial No. 586,699. Application for reissue filed October 5, 1912. Serial No. 724,227.

*To all whom it may concern:*

Be it known that I, THOMAS SUCHLA, a citizen of the United States, residing at Courtenay, in the county of Stutsman and State of North Dakota, have invented new and useful Improvements in Loading and Unloading Devices, of which the following is a specification.

This invention relates to a loading and unloading device and the object of the invention is the provision of a novel, simple and convenient device which may be readily attached to a car door so that timber or other similar material may be loaded into or unloaded from the car.

A further object of the invention is the provision of novel means for adjusting and attaching device to door frames of different widths and for adjusting the supporting roller thereon whereby timber may be fed into or taken out of the car at any angle.

Further objects of the invention will appear as the following specific description is read in connection with the accompanying drawing which forms a part of this application and in which:—

Figure 1:
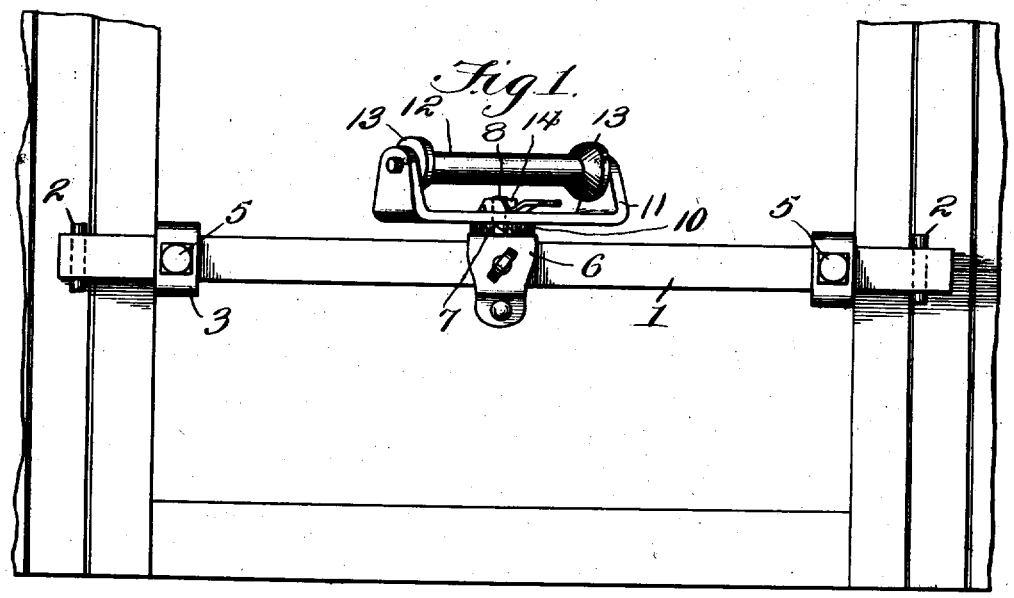
Figure 2:
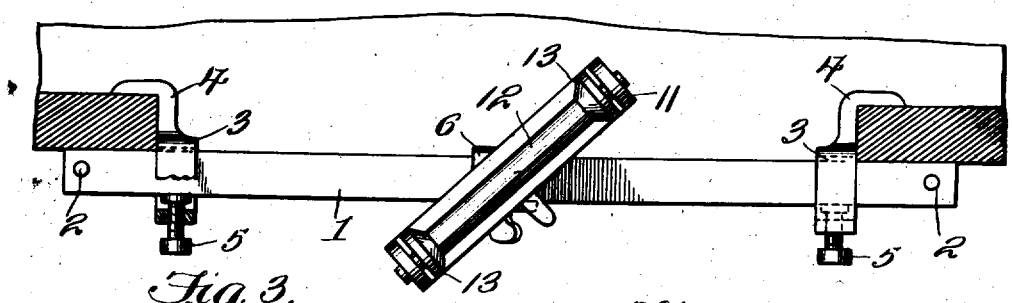
Figure 3:
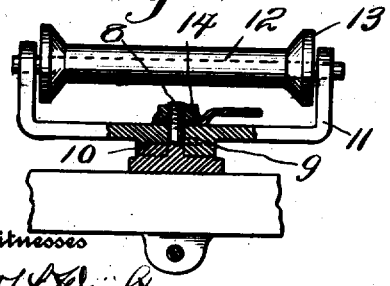
Figure 4:
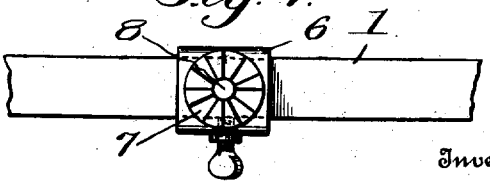

Figure 1 is a side elevation of the device attached to the car door. Fig. 2 is a section of the car door showing the device attached thereto in top plan view. Fig. 3 is a detail elevation of the roller and adjusting clamp partly in section. Fig. 4 is a top plan view of the supporting bar and clamp with the roller bracket removed.

Referring more particularly to the drawing, 1 represents a supporting bar which may be of any suitable length but is preferably long enough to bridge across the sides of the car door in present use. The ends of the bar have projecting vertically therefrom the pins 2 which are adapted to limit the movement of and prevent the disengagement of the clamping members 3 which are slidably mounted thereon. These clamping members comprise a substantially rectangular body larger than the bar and having extending therefrom the clamping arms 4 which are adapted to engage around the door frame and which are clamped thereagainst by means of set screws 5 which are threaded into the body and adapted to clamp against the edge of the supporting bar 1 to force the same into engagement with the outer side of the door frame. It will be clearly understood that the device may be reversed and the supporting bar arranged upon the inside of the door and the clamping arms arranged upon the outer side of the door and that any other type of securing device such as a cam may be utilized in place of the set screw described.

Slidably mounted upon the bar 1 is a clamp 6 which surrounds the same and is provided upon its upper side with a notched table 7 having a centrally projecting threaded stud 8 extending vertically therefrom. This stud is received by a central aperture 9 formed through the corresponding table 10 and a roller bracket 11 which is integral with the table 10. Journaled in the bracket 11 is a timber supporting roller 12 having flared ends 13 which are adapted to take up the thrust of the board. This bracket and roller are adapted to swing to any position upon the table 7 and are held in adjusted position by means of a lever nut 14 which is threaded upon the stud 8.

Having thus described the invention, what is claimed is:—

A device of the class described comprising a supporting bar, clips surrounding said bar and having laterally extending clamping arms, pins extending through the bar to limit the movement of and to prevent the disengagement of said clips, set screws carried by the clips for adjustably holding the supporting bar in engagement with a door frame, a clip slidably mounted on the bar and having a notched table, a threaded stud projecting therefrom, a bracket having a notched table thereon, and an aperture to receive said stud, a timber supporting roller journaled in the bracket, and a lever nut on the stud to clamp the tables together.

THOMAS SUCHLA.

Witnesses:
GEO. E. BRASTRUP,
G. A. TRANGSRUD.